US007644814B2

(12) United States Patent
Beattie

(10) Patent No.: US 7,644,814 B2
(45) Date of Patent: Jan. 12, 2010

(54) SUPERCHARGER DRIVE PULLEY

(75) Inventor: James C. Beattie, Baltimore, MD (US)

(73) Assignee: ATI Performance Products, Inc., Baltimore, MD (US)

( * ) Notice: Subject to any disclaimer, the term of this patent is extended or adjusted under 35 U.S.C. 154(b) by 232 days.

(21) Appl. No.: 11/583,137

(22) Filed: Oct. 19, 2006

(65) Prior Publication Data

US 2007/0193563 A1 Aug. 23, 2007

Related U.S. Application Data

(60) Provisional application No. 60/762,865, filed on Jan. 30, 2006, provisional application No. 60/727,873, filed on Oct. 19, 2005.

(51) Int. Cl.
*F16D 15/00* (2006.01)

(52) U.S. Cl. ................................ 192/45.1; 192/113.32

(58) Field of Classification Search ................ 192/45.1, 192/45, 113.32, 41 S, 113.34; 474/93, 70; 384/903, 473; 184/5, 105.1, 105.3
See application file for complete search history.

(56) References Cited

U.S. PATENT DOCUMENTS 1,930,319 A * 10/1933 Ocenasck ................ 192/66.21
1,978,680 A * 10/1934 Macdonald et al. ........... 192/61
2,670,825 A * 3/1954 Cherry ...................... 192/45.1
3,096,662 A * 7/1963 Mcrae ...................... 74/336 R
5,168,972 A * 12/1992 Smith .......................... 192/46
5,827,143 A * 10/1998 Monahan et al. .............. 474/73
7,047,644 B2 * 5/2006 Hodjat ...................... 29/892.1
2004/0173174 A1 * 9/2004 Sugino et al. .......... 123/179.28

FOREIGN PATENT DOCUMENTS

JP 07299765 A * 11/1995
WO WO 9421932 A2 * 9/1994

* cited by examiner

*Primary Examiner*—David D Le
*Assistant Examiner*—Justin Holmes
(74) *Attorney, Agent, or Firm*—Timothy J. Klima; Shuttleworth & Ingersoll, PLC

(57) ABSTRACT

A supercharger drive pulley includes an inner hub and an outer drive pulley. One of the inner hub and the outer drive pulley is drivingly connected to a drive shaft of a supercharger for driving the supercharger and the other of the inner hub and the outer drive pulley is drivingly connected to an engine for being driven by the engine. A one way drive clutch is drivingly engaged between the inner hub and the outer pulley to allow driving torque from the engine to be transmitted to the supercharger in one direction and to allow the supercharger to freewheel in conditions where it overruns the engine.

20 Claims, 4 Drawing Sheets

SUPERCHARGER DRIVE PULLEY

This application claims priority to U.S. Provisional Patent Application No. 60/727,873, filed Oct. 19, 2005, entitled "Supercharger Drive Pulley" and to U.S. Provisional Patent Application No. 60/762,865, filed Jan. 30, 2006, entitled "Supercharger Drive Pulley", both of which applications are incorporated by reference herein.

BACKGROUND OF THE INVENTION

The present invention relates to internal combustion engine superchargers.

Superchargers are frequently used on internal combustion piston engines to increase power of the engine. They are positively driven compressors used to pump air into the cylinders of the engine. The increase mass of oxygen forced into the cylinders by the supercharger allows the engine to burn more fuel, improving the volumetric efficiency and power of the engine. Superchargers are typically of a Roots (lobe) type, Eaton (twin screw) type or centrifugal type. Modern automotive superchargers are typically driven by a toothed belt from a toothed drive pulley on the engine's crankshaft, although they can also be chain, gear or shaft driven, or driven in some other manner. The loads on the belt can be quite high, as the supercharger can require as much as one third of the total crankshaft power of the engine. In present supercharger drive systems, the supercharger drive pulley and crankshaft drive pulley are both constructed of solid metal and allow no give to the belt.

When transitioning from higher throttle to lower throttle, and especially from full/high throttle to low/closed throttle, the rpm of the crankshaft decreases rapidly due to the decreased air flow. However, the inertia of the rotating mass of the supercharger acts against the supercharger rpm decreasing at a corresponding rate to the crankshaft rpm (depending on the drive ratio between the crankshaft and supercharger). This is particularly pronounced in high output supercharger applications, such as are found in racing applications, with very rapid transitions from full throttle, high engine (crankshaft) rpm to closed throttle, as might typically happen at the end of a drag strip run or when entering a corner. This is also pronounced on manually shifted cars that lift the throttle for each shift. This situation can create a very high reverse load on the belt, which can stretch, damage or even break the belt or cause other damage to the supercharger or supercharger drive system. Undesired loads, which damage or break components, or reduce their operating life, can also be caused even in more moderate situations which are not at the extremes of high output engines and/or very rapid full throttle/high rpm to closed throttle transitions. Many centrifugal superchargers overdrive the impeller as much as 6-1 to get impeller speeds in excess of 80,000 rpm, thus aggravating the amount of inertia the belt tries to stop when the throttle is suddenly closed.

Many superchargers used on street performance vehicles use serpentine belts for supercharger drive. The serpentine belts are longitudinally grooved to engage grooved pulleys. Such serpentine belts can slip on the pulleys. This can reduce loads on the supercharger and drive system and reduce belt breakage but this belt slippage also limits supercharger boost and thus, engine power. To counter this belt slippage, the width of the belts and pulleys can be increased but this again raises the peak loads on the supercharger and drive system and also absorbs more power from the engine to drive the wider belts. It is common to increase the width of the belts/pulleys from 6 grooves to 8, 10, 12, or even 16 groove belts to eliminate slippage. Many race cars use a 14 mm toothed belt to stop belt breakage but the use of such a belt over a standard 8 mm belt can absorb as much as 100 horsepower in a race engine, reducing total power output of the engine.

SUMMARY OF THE INVENTION

The present invention is a supercharger drive pulley that includes a one way drive clutch and a supercharger system that incorporates such a supercharger drive pulley. The one way drive clutch provides for a direct driving of the supercharger but also allows the supercharger to freewheel and overrun the crankshaft in situations where the supercharger rpm is correspondingly higher than the crankshaft rpm, such as the above-described very rapid full throttle/high rpm to closed throttle transitions. This decreases peak loads on the supercharger and supercharger drive system in general, and in particular, on the drive belt, thereby reducing damage to the supercharger and supercharger drive system and breakage of drive belts, increasing the life of such components, as well as potentially reducing operating costs. The present invention can also prevent supercharger and/or supercharger drive system failure that can disable the vehicle, especially at an undesired time and/or prior to the completion of a race or other performance event.

The supercharger drive pulley includes an inner hub connected to the supercharger drive shaft and an outer drive pulley connected to the supercharger drive belt (or other supercharger driving component). The one way drive clutch is functionally positioned between the inner hub and the outer drive pulley, and in the preferred embodiment, also physically positioned between the inner hub and outer drive pulley. It transmits torque in one direction but is freewheeling in the other direction.

It is an object of the present invention to overcome the above described problems.

It is a further object of the present invention to provide a supercharger drive pulley incorporating a one way drive clutch.

It is a further object of the present invention to provide a supercharger drive pulley that allows supercharger rpm to be higher than a corresponding crankshaft rpm (or other drive component rpm).

It is a further object of the present invention to reduce peak loads on a supercharger and supercharger drive system, as well as to reduce damage to and/or breakage of the supercharger and/or supercharger drive system.

It is a further object of the present invention to reduce peak loads on a supercharger drive belt, as well as to reduce damage to and/or breakage to the belt.

It is a further object of the present invention to increase an operating life of components of a supercharger and/or supercharger drive system.

It is a further object of the present invention to decrease an operating cost of a supercharger provided vehicle, and of the supercharger.

These and other objects of the present invention will be apparent from the attached description of the invention, including the figures.

The invention will be described in further detail below in conjunction with the attached figures, where like reference numerals indicate like components.

DETAILED DESCRIPTION OF THE INVENTION

Figure 1:
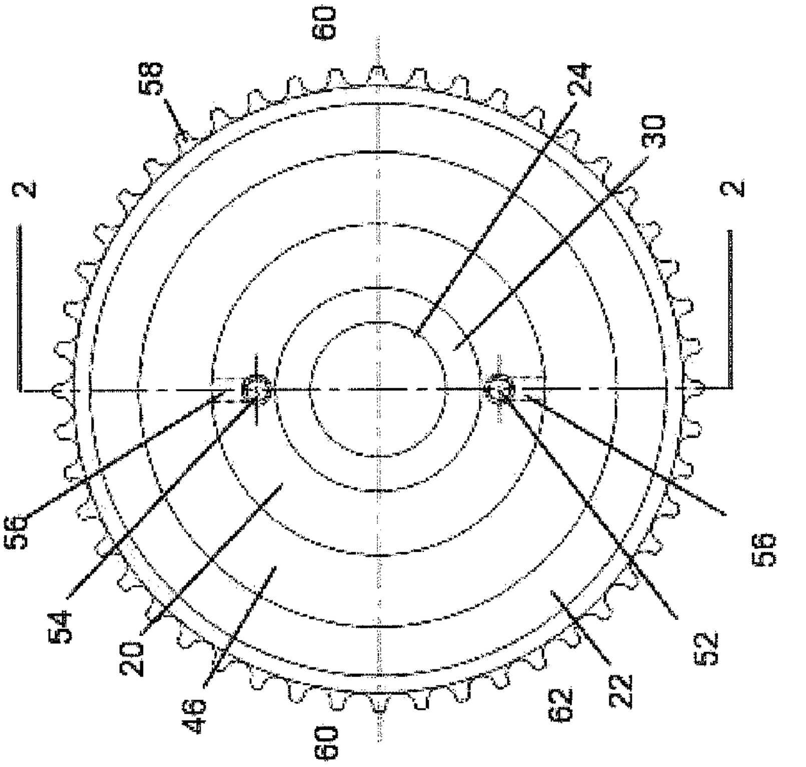
FIG. 1 is a front plan view of a supercharger drive pulley of the present invention, not mounted to a supercharger.
Figure 2:
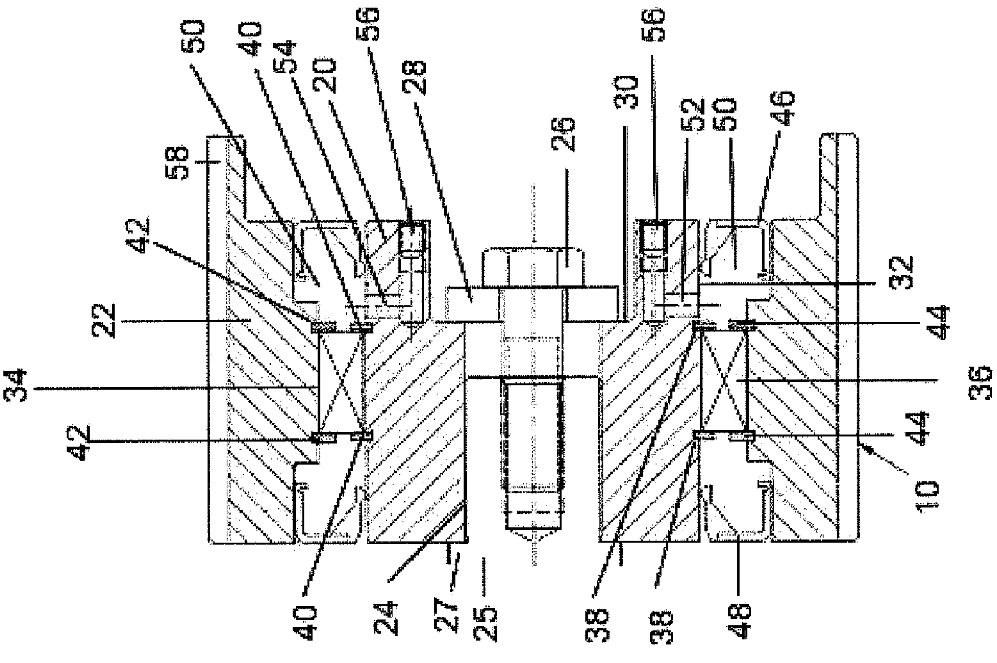
FIG. 2 is a sectional view of the supercharger drive pulley of FIG. 1 viewed along section line 2-2 shown in FIG. 1, shown mounted to a supercharger.
Figure 3:
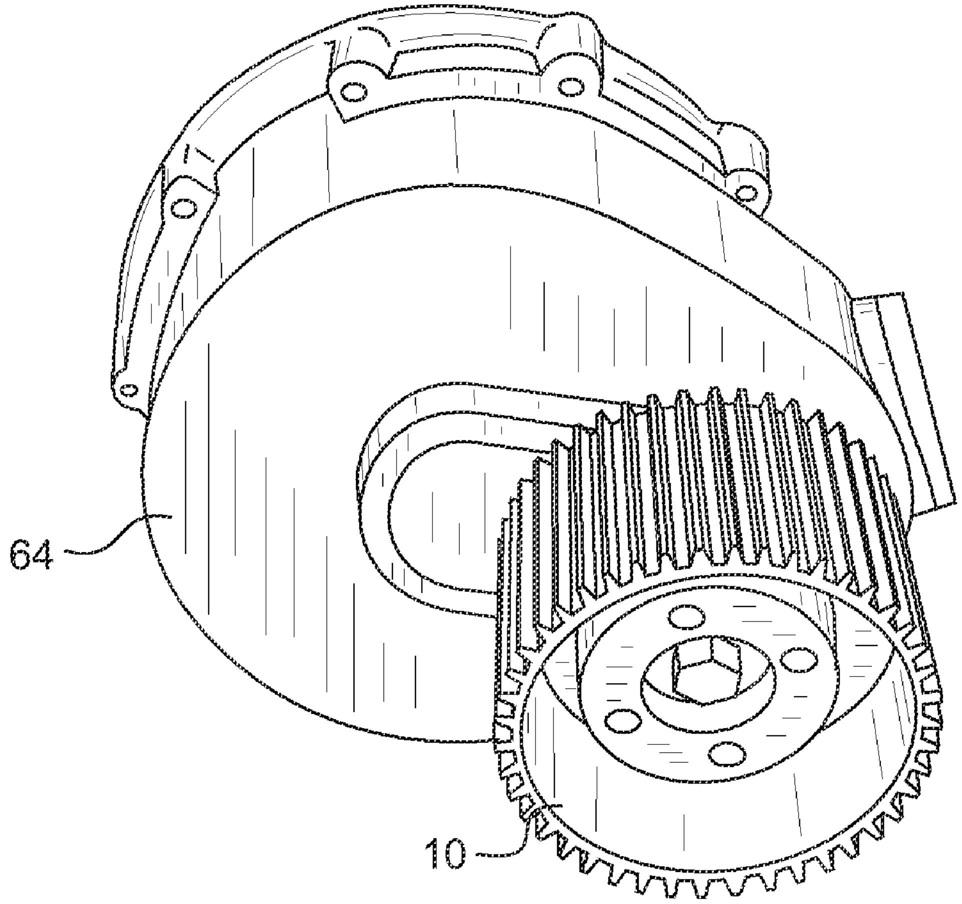
FIG. 3 is a perspective view of the supercharger drive pulley of FIG. 1 mounted on a supercharger.

The supercharger drive pulley 10 of the present invention includes an inner hub 20 and an outer drive pulley 22. The inner hub 20 includes an inner axial bore 24 sized to be positioned on an end of a drive shaft 25 of a supercharger 64 (FIG. 3) with a desired fit so as to drive the drive shaft 25 of the supercharger 64, and thus, drive the supercharger 64. The inner bore 24 can be slotted for a woodruff or other type of key, can be tapered for fitting on a tapered end of a shaft, or can be splined for fitting on a splined end of a shaft. Other hub/shaft fixing mechanisms can also be used. In the presently preferred embodiment, the drive shaft 25 includes two woodruff slots positioned 180° apart on the shaft 25 to accept two woodruff keys that engage two corresponding slots 62 positioned on the inner bore 24. A bolt 26 or other type of threaded fastener engages a threaded bore in the supercharger drive shaft 25 to retain the drive pulley 10 on the shaft. A washer 28 is preferably positioned between a head of the bolt 26 and an axial face 30 of the inner hub 20. The drive shaft 25 includes a flange 27 against which the rear of the inner hub 20 engages when the drive pulley 10 is installed on the drive shaft 25 and bolted in place.

The inner hub 20 includes an outer circumferential surface 32 and the drive pulley 22 includes an inner bore 34 between which a one way drive clutch 36 is positioned. Such one-way drive clutches are well known. They transmit torque in one direction but are freewheeling in the other direction. They come in different types, for instance, sprag clutches or roller clutches. In the presently preferred embodiment, a sprag clutch supplied by Borg-Warner® is used. Any type of one-way clutch can be used, as long as it meets the specific requirements of the application of the supercharger drive pulley 10. The one way drive clutch 36 allows torque to be transmitted from the outer drive pulley 22 in one direction to the inner hub 20 and thus, to the supercharger drive shaft 25 but allows the outer pulley 22 to freewheel on the inner hub 20 in the opposite direction. The inner hub 20 includes two circumferential slots 38 on its outer surface 32 to accommodate two inner retaining rings 40. The outer pulley 22 similarly includes two circumferential slots 42 on its inner bore 34 to accommodate two outer retaining rings 44. The slots 38 and 42 are axially distanced from one another to appropriately axially position the one way drive clutch 36 between the inner retaining rings 40 and the outer retaining rings 44.

A front seal 46 and rear seal 48 are positioned between the inner hub 20 and the outer pulley 22 respectively in front of and behind the one way drive clutch 36. This forms an enclosed clutch area 50 that can be filled with lubricant for the clutch 36. First and second lubrication ports 52 and 54 are provided in the inner hub 20 that allow access to the enclosed clutch area 50 from the front of the supercharger drive pulley 10 for easy lubrication of the clutch 36. In a preferred embodiment, the ports 52 and 54 are threaded at their front portions. This allows for a threaded connection with a pressurized lubrication source and also allows for headless screws 56 to be threaded into the ports 52 and 54 after lubrication to completely seal the enclosed clutch area 50 and prevent leakage of the lubricant. In a preferred embodiment, the ports 52 and 54 are spaced apart from one another on the inner hub to encourage a cross-flow of lubricant through then enclosed clutch area 50 and ensure adequate lubrication of the clutch 36.

Figure 4:
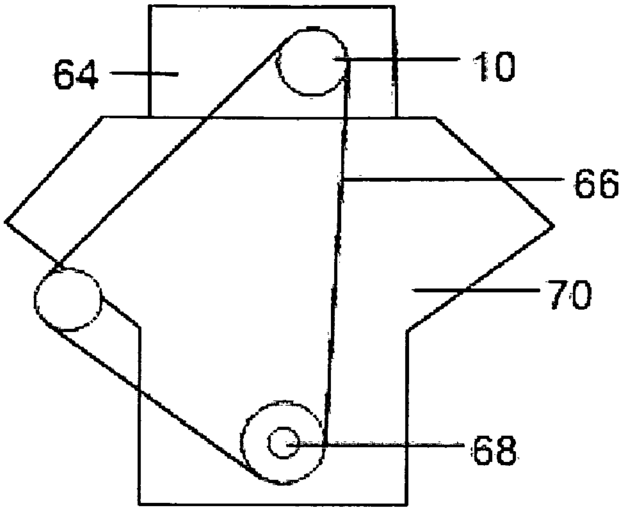
FIG. 4 is a partial schematic view of a supercharged engine with a first embodiment of the present invention.

Outer pulley 22 includes a plurality of teeth 58 positioned around its periphery to be driven by a conventional toothed belt 66, which is in turn driven by a crankshaft/crankshaft damper 68 of engine 70. See FIG. 4. The teeth 58 can be in a standard 8 mm pitch or can be any pitch, size or configuration desired. The number of teeth 58 can also be altered for a desired drive ratio for the supercharger 64. Inner hub 20 is provided with a pair of threaded axial bores 60 on its front side to receive threaded elements of a gear puller so that the pulley 10 can be readily removed from the supercharger drive shaft 25.

The dimensions of the various components can be altered as desired for the specific application. The inner hub 20 and outer pulley 22 are preferably made from a high strength steel, although they can also be made from other materials.

The present invention decreases the load on a supercharger and supercharger drive system in general, and in particular, on a supercharger drive belt, thereby reducing damage to the supercharger and/or supercharger drive system, including breakage of drive belts, increasing the life of such components, preventing damage to such components further causing damage to other engine and vehicle components, and reducing operating costs. This is especially the case where the engine goes suddenly from high RPM to closed throttle. In such cases, the present invention allows the supercharger to overrun the engine and slow its RPM at its own pace, and not at a pace dictated by the engine. The present invention can also prevent supercharger and supercharger drive system failure that can disable the vehicle, especially at an undesired time and/or prior to the completion of a race or other performance event.

Although the supercharger drive pulley 10 of the present invention has been shown and described above as being belt driven, it can also be used in chain drive or gear drive applications. In such applications, the outer surface of the outer pulley 22 will be configured as necessary for the specific drive. Similarly, the supercharger drive pulley 10 of the present invention can be used with other types of supercharger drive systems by providing an appropriate drive system interface on the outer drive pulley 22. Thus, the present invention is not to be limited for use with belt drive systems only. The supercharger drive pulley 10 can be used with any type of supercharger.

Further, in alternative applications, it is contemplated that the outer drive pulley can be connected to the supercharger drive pulley and the inner hub can be connected to the supercharger drive system. It is also contemplated that the invention can be used with drive systems that are not driven directly by the crankshaft but by other, or intermediate, components. The present invention can also utilize a one way drive clutch that is not physically positioned between the inner hub and outer drive pulley but is functionally positioned between the two components.

Figure 5:
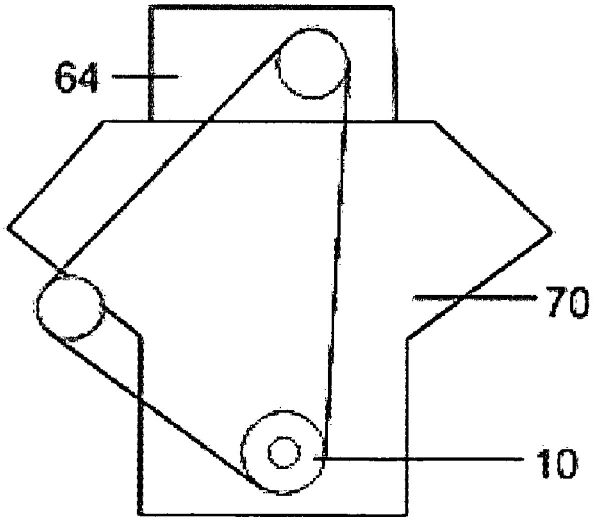
FIG. 5 is a partial schematic view of a supercharged engine with a second embodiment of the present invention.
Figure 6:
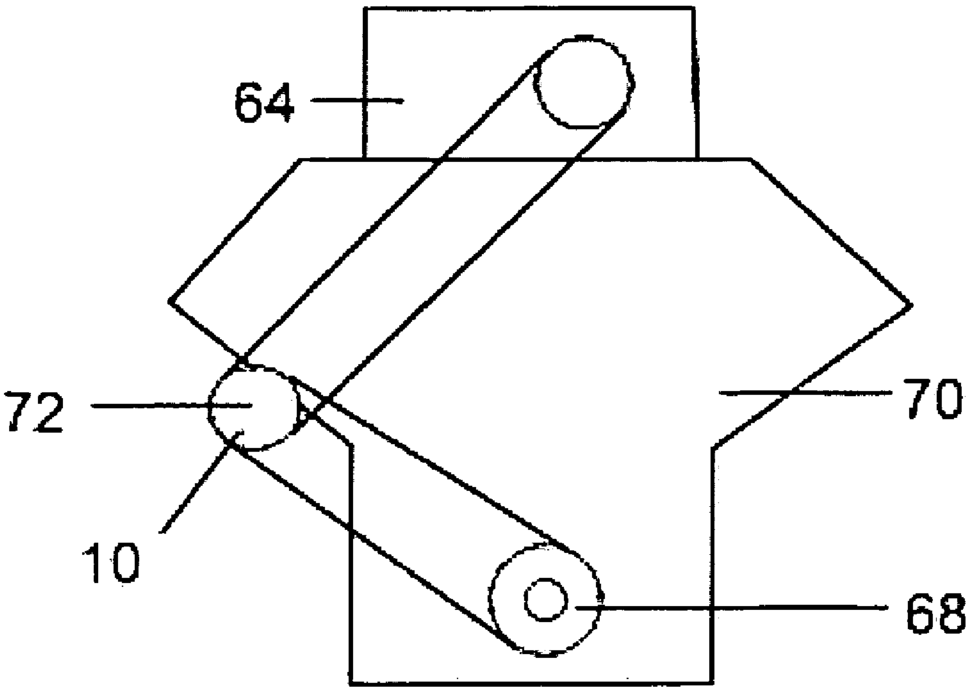
FIG. 6 is a partial schematic view of a supercharged engine with a third embodiment of the present invention.

In an alternative embodiment, the supercharger drive pulley 10 of the present invention need not be directly mounted to the supercharger drive shaft 25, but can be mounted remotely from the supercharger, such as on the engine crankshaft or crankshaft damper (see FIG. 5) or other structure driven by the crankshaft, including a camshaft. Alternatively, the supercharger drive pulley 10 can be mounted to a separate shaft driven by the crankshaft. In such an arrangement, the crankshaft would drive one end of a jackshaft assembly 72 and the other end of the jackshaft assembly would drive the supercharger, with the supercharger drive pulley 10 being mounted on either end of the jackshaft assembly. See FIG. 6. Other intermediate driving arrangements can also be used with the present invention. In these alternative embodiments, the important aspect is that the supercharger drive pulley 10 is interposed between the primary drive component (such as the crankshaft) and the supercharger drive shaft 25.

Various aspects of the various embodiments can be combined in different configurations to create different embodiments. The present invention is not limited to the disclosed embodiments.

What is claimed is:

1. A supercharger drive pulley, comprising:

an inner hub;

an outer drive pulley; wherein one of the inner hub and the outer drive pulley is drivingly connected to a drive shaft of a supercharger for driving the supercharger and the other of the inner hub and the outer drive pulley is drivingly connected to an engine for being driven by the engine;

a one way drive clutch drivingly engaged between the inner hub and the outer drive pulley to allow driving torque from the engine to be transmitted to the supercharger in one direction and to allow the supercharger to freewheel in conditions where it overruns the engine;

a front seal and a rear seal positioned between the inner hub and the outer drive pulley respectively in front of and behind the one way drive clutch to form an enclosed clutch area for containing lubricant for the one way drive clutch; and first and second lubrication ports positioned at a front of the inner hub and connecting to the enclosed clutch area for lubricating the enclosed clutch area from a front of the supercharger drive pulley.

2. The supercharger drive pulley of claim 1, wherein the supercharger drive pulley is mounted on the supercharger.

3. The supercharger drive pulley of claim 2, wherein the inner hub is mounted on a drive shaft of the supercharger to drive the supercharger and the outer drive pulley is belt driven by the engine.

4. The supercharger drive pulley of claim 3, wherein the inner hub includes an inner axial bore sized to be positioned on the drive shaft of the supercharger with a desired fit, the inner hub being rotationally fixed to the drive shaft by at least one of a key, spline and taper connection.

5. The supercharger drive pulley of claim 4, wherein the first and second lubrication ports are spaced apart from one another on the inner hub to provide a cross-flow of lubricant through the enclosed clutch area during lubrication.

6. The supercharger drive pulley of claim 5, wherein the first and second lubrication ports are threaded at their front portions for connection with a pressurized lubrication source.

7. The supercharger drive pulley of claim 6, and further comprising first and second headless screws for threading into the ports after lubrication to seal the enclosed clutch area.

8. The supercharger drive pulley of claim 7, wherein the inner hub includes two circumferential slots on an outer surface thereof to accommodate two inner retaining rings and the outer pulley similarly includes two circumferential slots on an inner bore thereof to accommodate two outer retaining rings, with the respective slots being axially distanced from one another to axially position the one way drive clutch between the inner retaining rings and the outer retaining rings.

9. The supercharger drive pulley of claim 1, wherein the first and second lubrication ports are spaced apart from one another on the inner hub to provide a cross-flow of lubricant through the enclosed clutch area during lubrication.

10. The supercharger drive pulley of claim 9, wherein the first and second lubrication ports are threaded at their front portions for connection with a pressurized lubrication source.

11. The supercharger drive pulley of claim 10, and further comprising first and second headless screws for threading into the ports after lubrication to seal the enclosed clutch area.

12. The supercharger drive pulley of claim 1, wherein the inner hub includes two circumferential slots on an outer surface thereof to accommodate two inner retaining rings and the outer drive pulley similarly includes two circumferential slots on an inner bore thereof to accommodate two outer retaining rings, with the respective slots being axially distanced from one another to axially position the one way drive clutch between the inner retaining rings and the outer retaining rings.

13. The supercharger drive pulley of claim 1, wherein the one way drive clutch is a sprag clutch.

14. The supercharger drive pulley of claim 1, wherein the outer drive pulley includes a plurality of teeth positioned around its periphery to be driven by a toothed belt.

15. The supercharger drive pulley of claim 1, wherein the inner hub includes a pair of threaded axial bores on a front side thereof to receive threaded elements of a gear puller for removal of the pulley from the supercharger drive shaft.

16. The supercharger drive pulley of claim 1, wherein the supercharger drive pulley is mounted remotely from the supercharger.

17. The supercharger drive pulley of claim 16, wherein the supercharger drive pulley is mounted on an engine crankshaft.

18. The supercharger drive pulley of claim 16, wherein the supercharger drive pulley is mounted on a crankshaft damper.

19. The supercharger drive pulley of claim 16, wherein the supercharger drive pulley is mounted on a separate shaft driven by an engine crankshaft, to be drivingly disposed between the crankshaft and the supercharger.

20. The supercharger drive pulley of claim 19, wherein the separate shaft is a jackshaft, with the crankshaft driving one end of the jackshaft the supercharger being driven by another end of the jackshaft, with the supercharger drive pulley being drivingly mounted on either end of the jackshaft.

* * * * *